Figure 1:
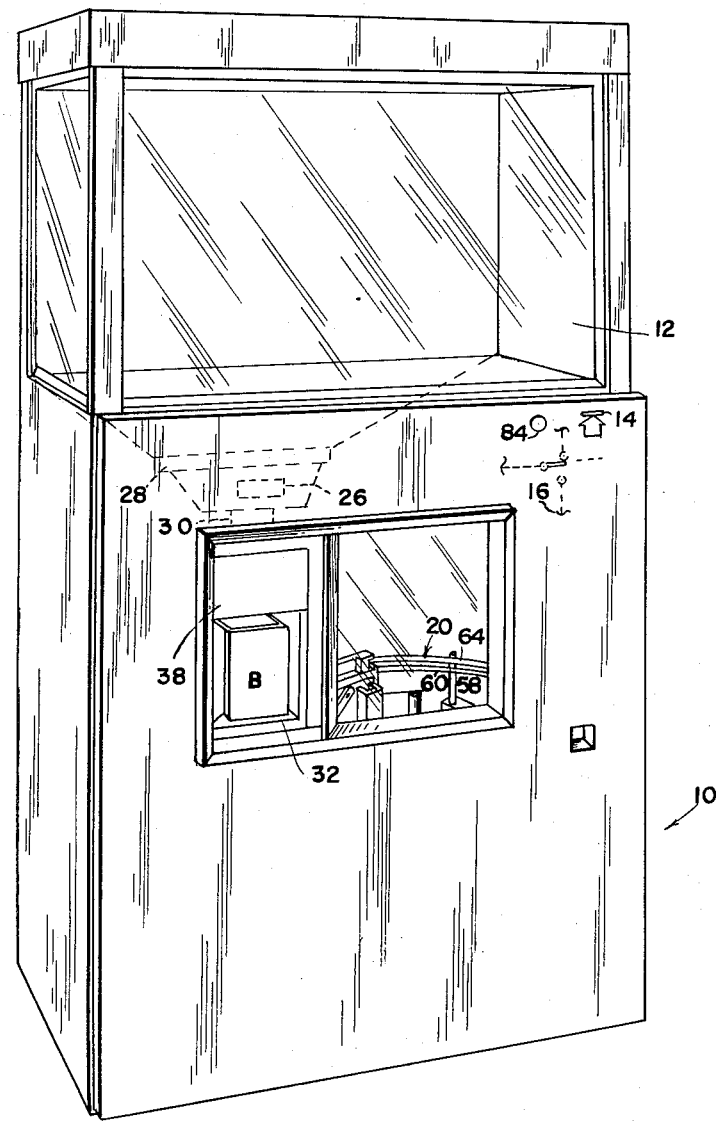

March 13, 1962  F. A. GASTRIGHT  3,024,583
BOX ERECTING AND VENDING MACHINE
Filed Feb. 2, 1960  10 Sheets-Sheet 1

INVENTOR
Frank A. Gastright
BY James H. Littlepage
ATTORNEY

March 13, 1962     F. A. GASTRIGHT     3,024,583
BOX ERECTING AND VENDING MACHINE
Filed Feb. 2, 1960     10 Sheets-Sheet 2

BY Frank A. Gastright
James H. Littlepage ATTORNEY

March 13, 1962  F. A. GASTRIGHT  3,024,583
BOX ERECTING AND VENDING MACHINE
Filed Feb. 2, 1960  10 Sheets-Sheet 3

INVENTOR
Frank A. Gastright
BY James H. Littlepage
ATTORNEY

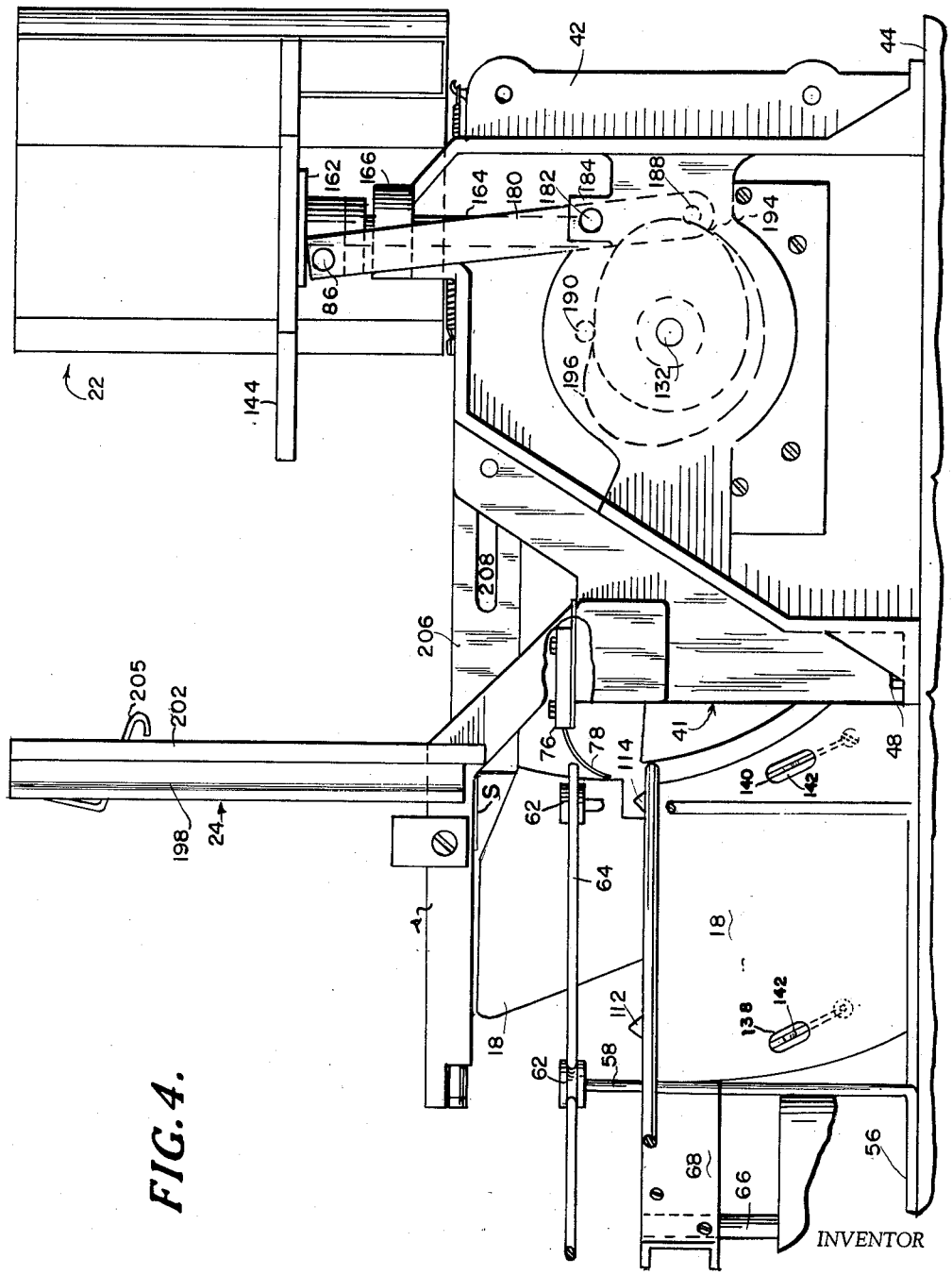

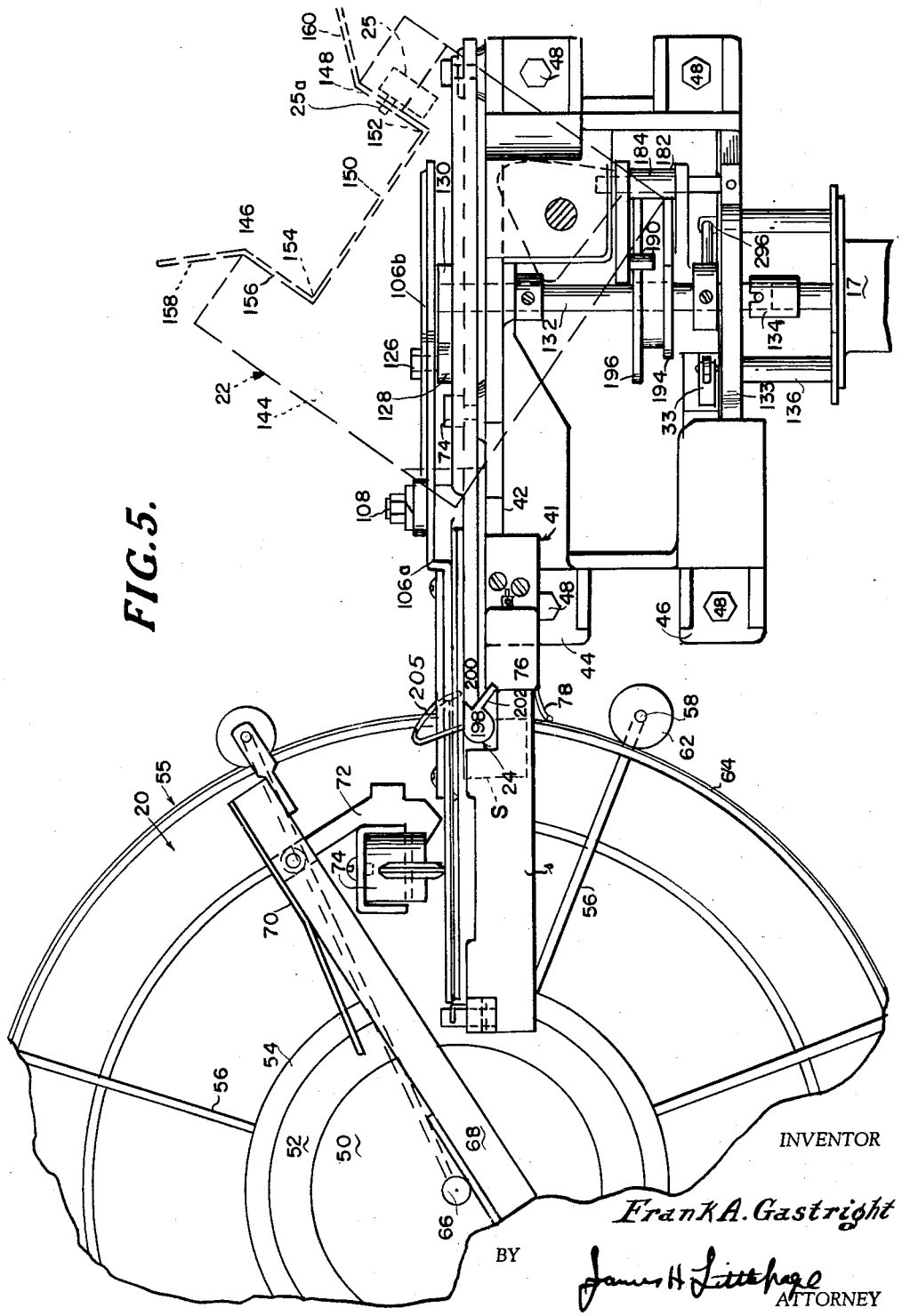

March 13, 1962  F. A. GASTRIGHT  3,024,583
BOX ERECTING AND VENDING MACHINE
Filed Feb. 2, 1960  10 Sheets-Sheet 6

INVENTOR
*Frank A. Gastright*

BY
*James H. Littlepage*
ATTORNEY

March 13, 1962   F. A. GASTRIGHT   3,024,583
BOX ERECTING AND VENDING MACHINE
Filed Feb. 2, 1960   10 Sheets-Sheet 7
FIG.11.
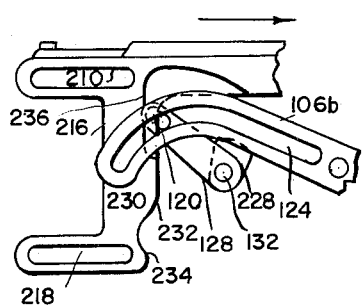
FIG.7.
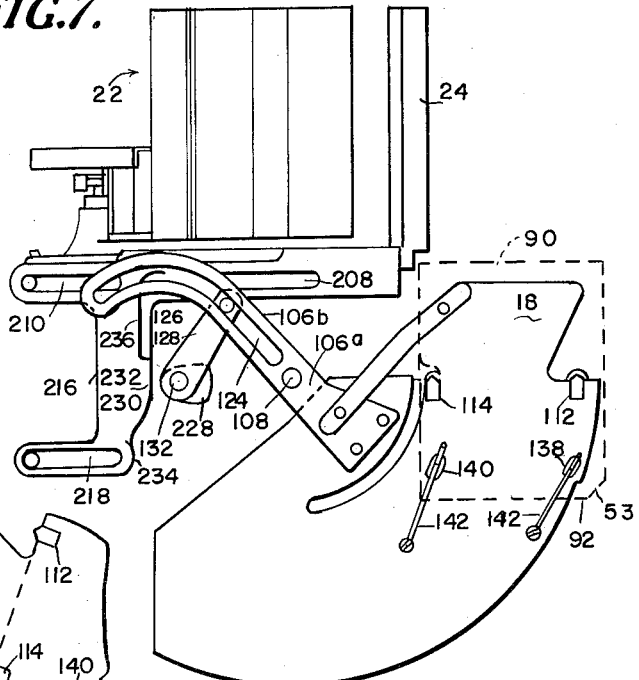
FIG.9.
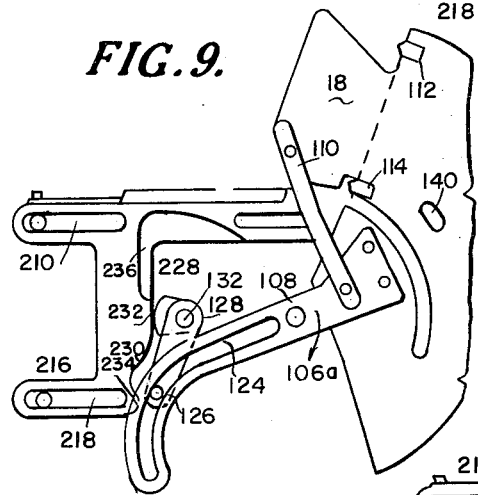
FIG.8.
FIG.10.
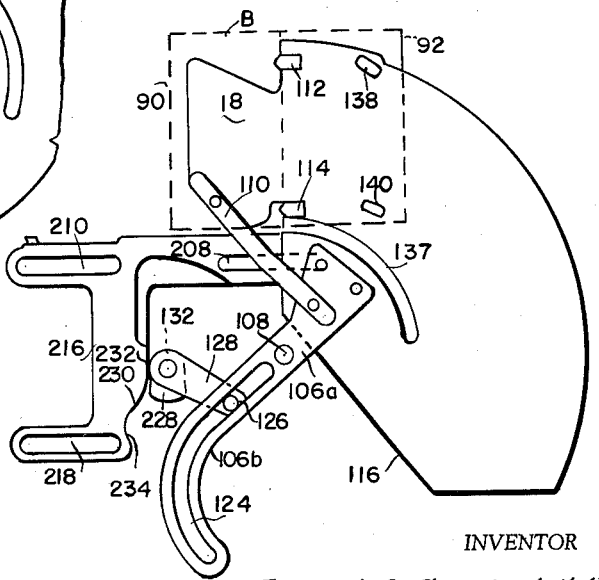
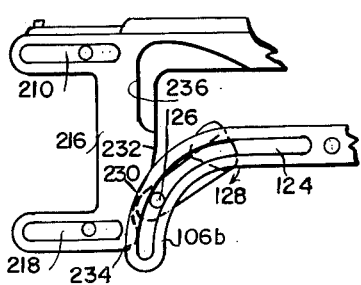
INVENTOR
Frank A. Gastright
BY James H. Littlepage
ATTORNEY

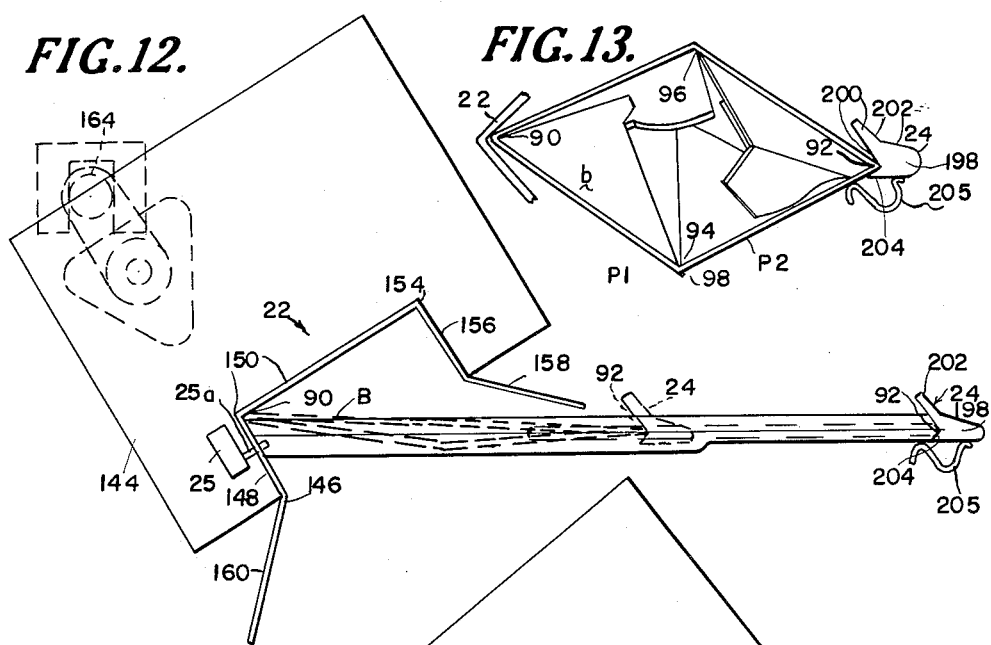

March 13, 1962  F. A. GASTRIGHT  3,024,583
BOX ERECTING AND VENDING MACHINE
Filed Feb. 2, 1960  10 Sheets-Sheet 9

INVENTOR
*Frank A. Gastright*

BY *James H. Littlepage*

ATTORNEY

March 13, 1962 F. A. GASTRIGHT 3,024,583
BOX ERECTING AND VENDING MACHINE
Filed Feb. 2, 1960 10 Sheets-Sheet 10
FIG.21.
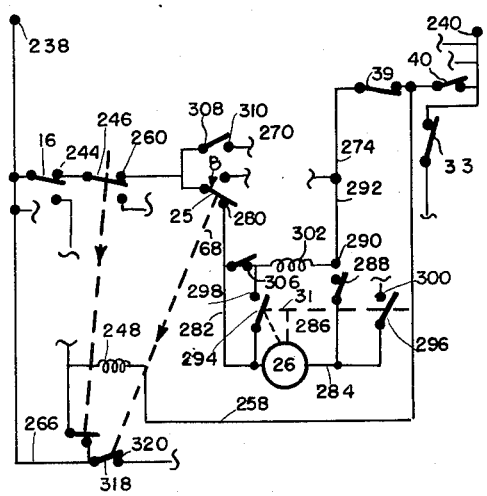
FIG.22.
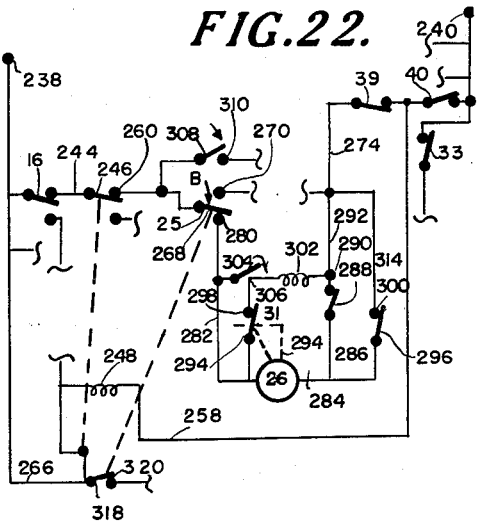
FIG.23.
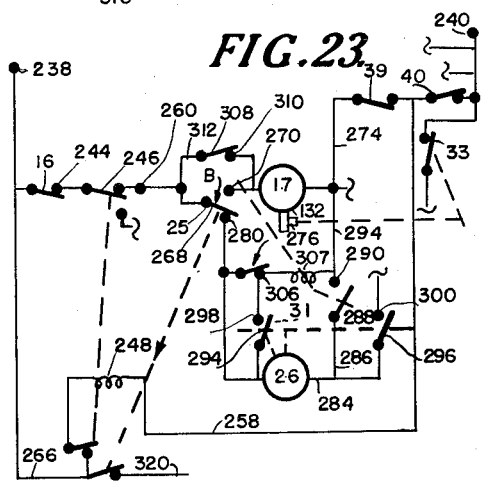
FIG.24.
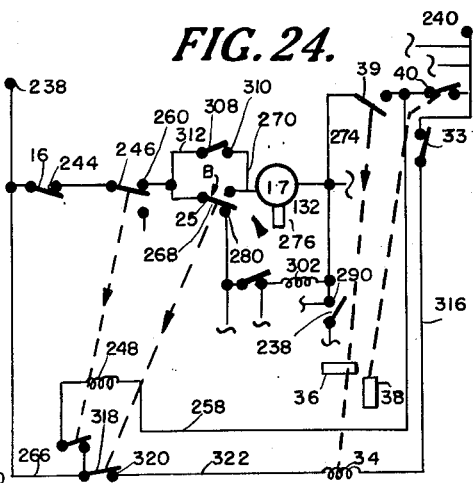
FIG.25.
INVENTOR
Frank A. Gastright
BY James H. Littlepage
ATTORNEY

United States Patent Office 3,024,583
Patented Mar. 13, 1962

3,024,583
BOX ERECTING AND VENDING MACHINE
Frank A. Gastright, Cincinnati, Ohio, assignor to Vend-A-Box, Inc., Cincinnati, Ohio, a corporation of Ohio
Filed Feb. 2, 1960, Ser. No. 6,197
5 Claims. (Cl. 53—186)

This invention relates to a vending machine and, more particularly, to improvements in a mechanism for storing and erecting box blank having self-locking bottoms, and for delivering an erected box, filled with popcorn, through an access door at the front of the machine. This application is a continuation in part of my copending application Serial No. 598,096 filed July 16, 1956, and entitled, Popcorn Packaging and Delivering.

In my copending application, there is disclosed a popcorn vending machine wherein flat, collapsed blank boxes with self-locking bottoms are stored in a circular row on a rotary magazine, and wherein the endmost box is wiped off the row by a feeder blade and transported to an erecting station. At the end of its feed stroke, the feeder blade pushes the leading edge of the folded box blank into a corner of a rectangular form, and the trailing edge of the folded box blank is deposited in front of a pusher. During the return stroke of the feeder blade, the pusher forces the trailing edge of the box blank towards the erecting form until the box is completely opened and the bottom locks. After erection, the box is filled with popcorn and the form then rotates to deliver the box to the customer through an access opening in the front of the vending machine casing. The object now is to provide certain improvements relating to the shape of the feeder blade, the engagement of the feeder blade with a side of the box blank, the positive guiding of the box blank along a predetermined path from the magazine to the erecting form, the positive engagement of the trailing edge of the box blank with the pusher, and the drive mechanisms for the feeder blade, pusher, and form. It is intended also to provide certain improvements for repeating the operating cycle in event a box blank is not erected in the filling form, and disabling the mechanism at the end of the operating cycle until a filled box is removed from the machine by the consumer.

Figure 2:
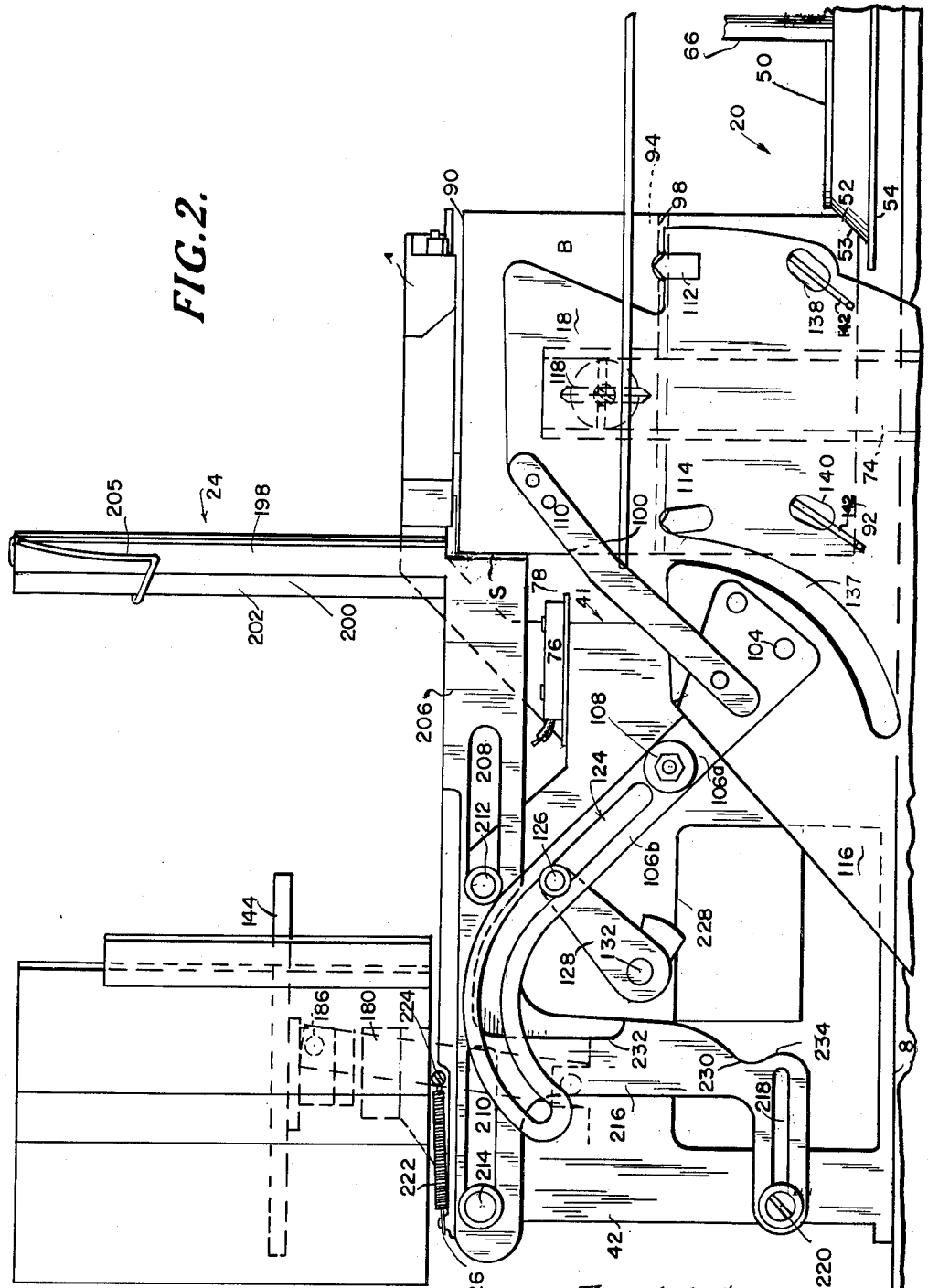
Figure 3:
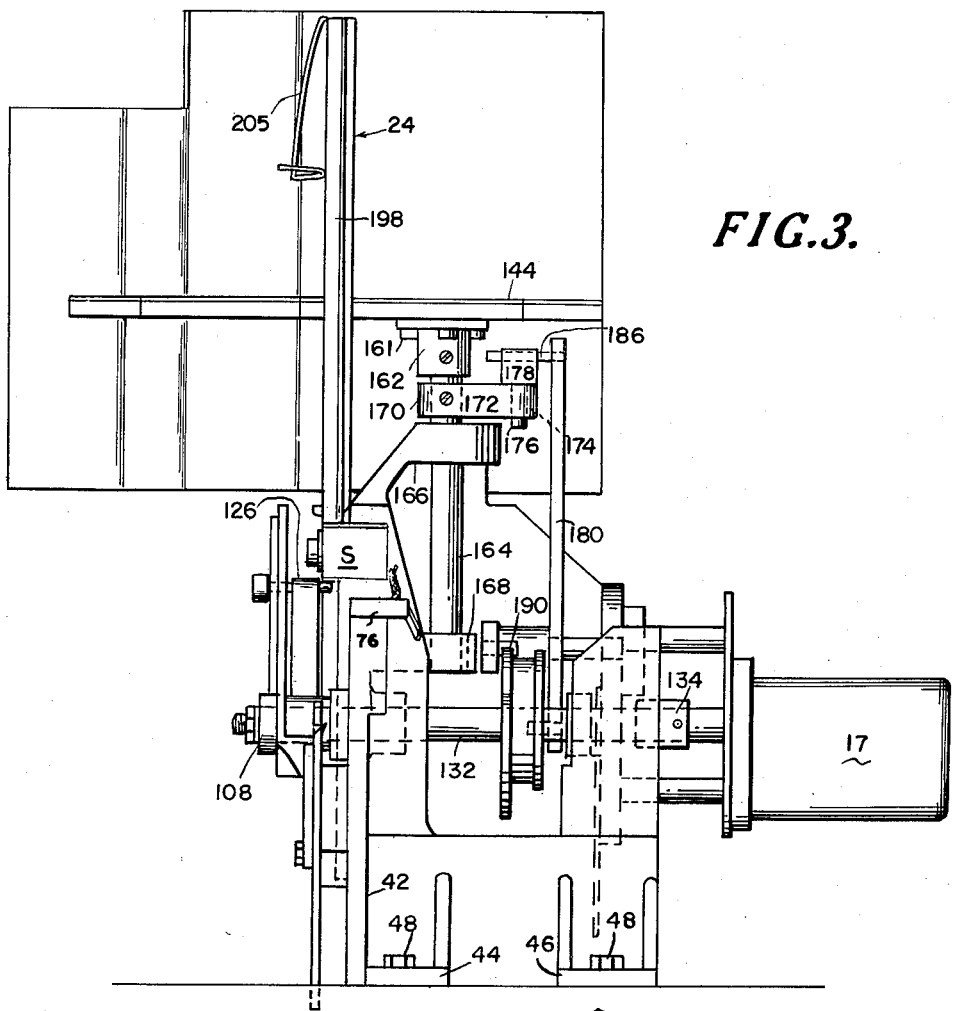
Figure 17:
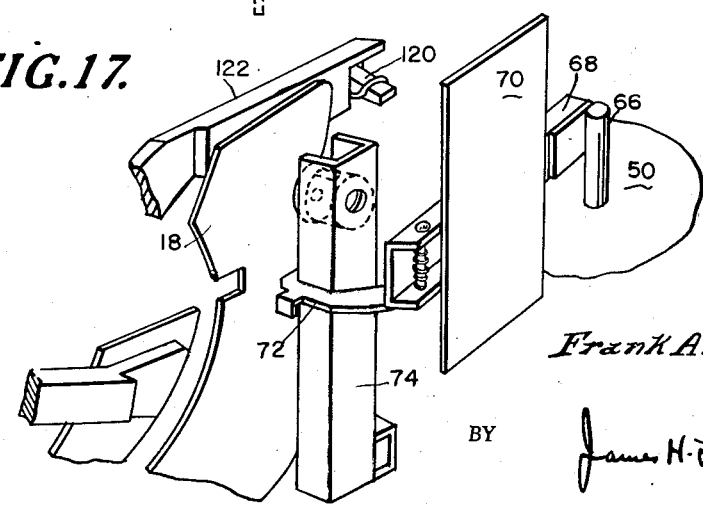
Figure 6:
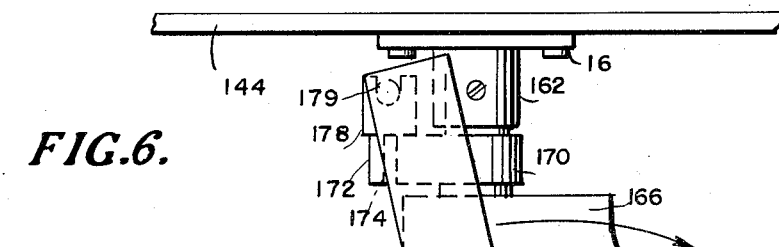
Figure 16A:
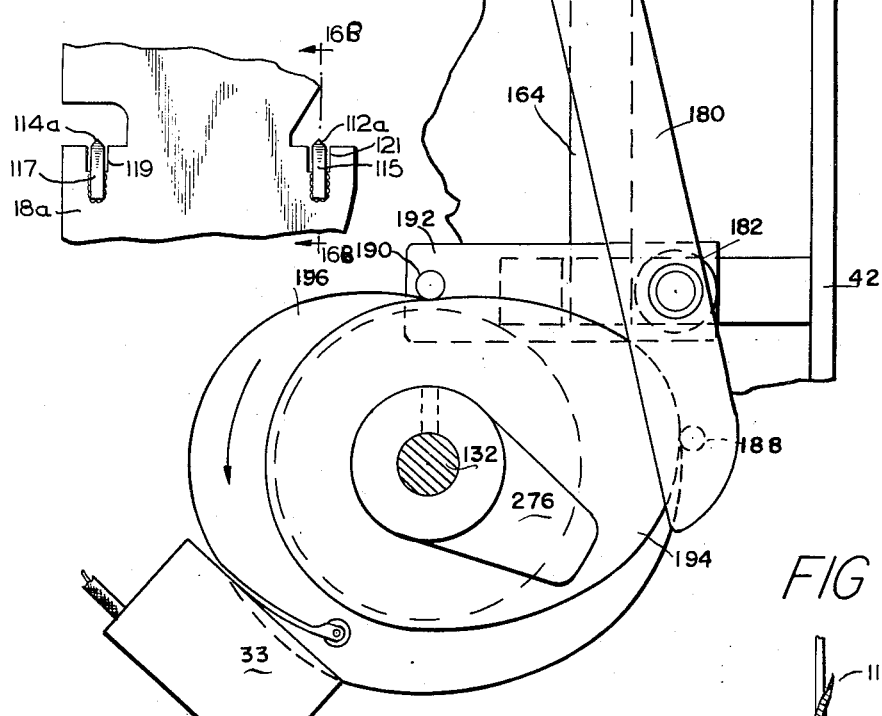
Figure 16B:
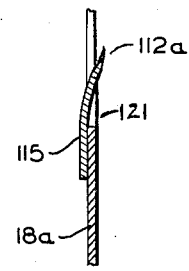
Figure 16:
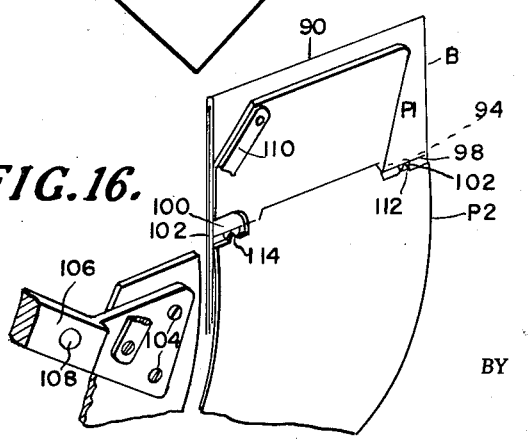
Figure 18:
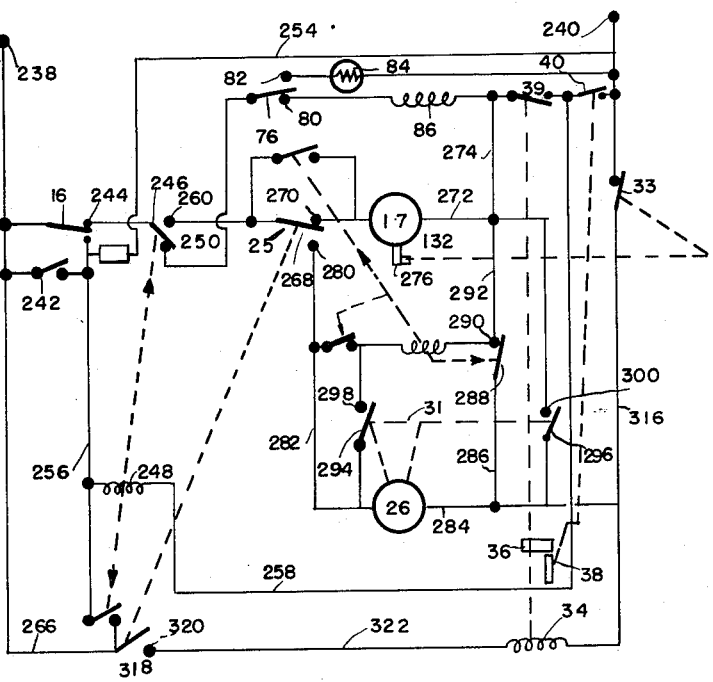
Figure 19:
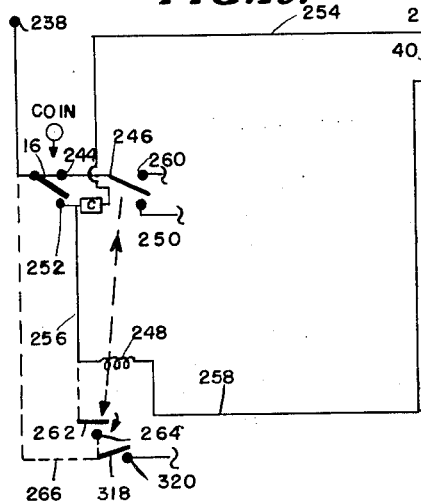
Figure 20:
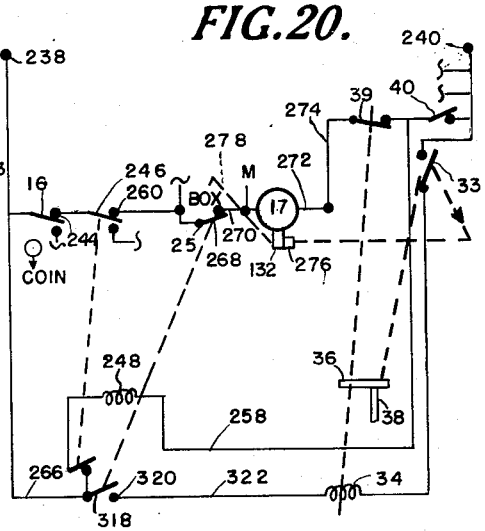

These and other objects will be apparent from the following specification and drawings, in which:

FIG. 1 is a front perspective view of the entire machine;
FIG. 2 is a front elevation of the mechanism, shortly after the start of a cycle of operation, with part of the magazine broken off;
FIG. 3 is a side elevation of the mechanism as shown in FIG. 2, as seen from the right-hand side of FIG. 2;
FIG. 4 is a rear elevation of the mechanism, in the condition shown in FIGS. 2 and 3, but with the drive motor removed;
FIG. 5 is a plan view of the mechanism in the condition shown in FIGS. 2–4, with the erecting form shown in broken lines, and with parts of the magazine and drive motor broken away;
FIG. 6 is an enlarged rear elevation showing the details of the driving cam, cam follower, and drive lever for the erecting form, and showing the stop-cycle micro-switch open between cycles;
FIG. 7 is an enlarged front elevation showing the details of the feeder blade and drive crank after the feed stroke has started and the feeder blade has engaged the endmost box blank of the magazine stack;
FIG. 8 is an enlarged front elevation similar to FIG. 7, but showing the feeder blade at the end of its feed stroke, and showing the pusher drive cam nearing engagement with the pusher carriage to start the slow phase of the push stroke;
FIG. 9 is a fragmentary view showing the feeder blade drive crank during the blade return stroke, and showing the pusher drive pin nearing engagement with the pusher carriage to start the fast phase of the push stroke;
FIG. 10 is a fragmentary view showing the feeder blade drive crank near the end of the blade return stroke, and showing the pusher drive pin nearing the end of the push stroke of the pusher carriage;
FIG. 11 is a fragmentary view similar to FIG. 10, but showing the blade drive crank at the end of the cycle, and with the pusher carriage undergoing its return stroke;
FIG. 12 is a fragmentary plan view showing the erecting form and pusher when the feeder blade has completed its feed stroke, the drive elements being in the position shown in FIG. 8, and the push stroke is ready to start;
FIG. 13 is a diagrammatic plan view showing the push stroke partly completed, the drive elements being in the position shown in FIG. 10, the feeder blade then being on its return stroke;
FIG. 14 is a diagrammatic plan view showing the push stroke completed;
FIG. 15 is a fragmentary plan view showing the erecting form rotated to delivery position, and showing the pusher returned to its between-cycle dwell position;
FIG. 16 is a fragmentary perspective view showing the engagement of the feeder blade with a box blank;
FIG. 16A is a fragmentary front elevation showing a modified form of prongs on the feeder blade;
FIG. 16B is a fragmentary cross section of the prong modification illustrated in FIG. 16A;
FIG. 17 is a fragmentary view showing the details of the stripper, and showing the magazine shove-plate latched so that the magazine may be charged with box blanks;
FIG. 18 is a diagram showing the complete circuits for operating the machine, the various relays and switches being shown in nominal between-cycle condition prior to insertion of a coin;
FIGS. 19 through 25 are fragmentary circuit diagrams on a scale slightly reduced from that of FIG. 18 showing the significant active portions of the circuit shown in FIG. 18 during successive portions of an operating cycle, wherein;
FIG. 19 denotes the insertion of a coin and the consequent energization of the holding relay;
FIG. 20 shows the holding relay closed and the consequent energization and starting of the main motor, the mechanism then being in the condition shown in FIG. 7;
FIG. 21 shows the opening of the main motor circuit resulting from the erection of a box in the box form and the consequent closing of the popcorn motor circuit, the parts then being in the condition shown in FIG. 14;
FIG. 22 shows the dwell of the main motor while the popcorn dispenser dumps a charge of popcorn into the erected box and the popcorn dispenser motor closes a stick circuit for the relay which closes a jumper circuit to re-start the main motor;
FIG. 23 shows the main motor re-started and the popcorn motor having just opened its cycle-end switches, the parts then being substantially as shown in FIG. 11;
FIG. 24 shows the energization of the doorlock solenoid circuit by closure of the main motor cycle-end switch and the consequent opening of the main motor circuit, the parts then being as shown in FIGS. 7 and 15; and,
FIG. 25 shows the opening of the door switch resulting from lifting of the delivery door, thereby breaking the holding circuit, and the swinging of the box form switch resulting from removal of the erected and filled box through the delivery door opening, thereby breaking the door lock solenoid circuit.

GENERAL MODE OF OPERATION

Referring first to FIG. 1 of the drawings, the popcorn vending machine is enclosed within a case 10 having a popcorn supply bin 12 in its upper portion. The lower portion of the case contains the mechanism detailed in subsequent figures, plus sufficient space below the mechanism to catch spilled popcorn or dropped box blanks. In order to operate the machine, a coin is inserted in slot 14 so as momentarily to swing a coin actuated switch 16 (FIG. 18) and thereby institute an operating cycle which, in general terms, runs as follows: A main motor 17 (FIGS. 2 and 10) is energized so as to cause a box blank feeder blade 18 to feed a collapsed box B having a self-erecting bottom $b$ from a magazine 20 to an erecting form 22 (FIG. 2). A pusher 24 advances to complete the erection of box in form 22. When the box has been fully erected, it pushes the plunger 25a of a switch 25 on form 22 (FIG. 21) so as to cut off the circuit for main motor 17 and close a circuit to a popcorn dispenser motor 26 (FIG. 21) which drives a charge measuring device, diagrammatically indicated at 28 in FIG. 1 so as to dispense enough popcorn to fill the box from bin 12 downwardly through a chute 30 to the waiting erected box in form 22. The details of the popcorn charge measuring mechanism form no part of this invention, it being sufficient to note that after the dispenser motor 26 has operated sufficiently to cause the box to be filled with popcorn, a double-pole single-throw switch 31 is actuated by the dispenser motor drive to effect restarting of main motor 17. Immediately after main motor 17 restarts, dispenser motor 26 is cut off (FIG. 23) and, near the completion of the return strokes of the feeder blade and pusher, erecting form 22 is rotated by a drive from main motor 17 so as to swing the form to move the filled box to a delivery station 32 at the front of the case 10, whereupon a cycle end switch 33 is closed by main motor 17 (FIG. 24) so as to energize a solenoid 34, thereby withdrawing a latch 36 to permit the raising of a vertically slidable transparent front door 38. The energization of door latch solenoid 34 simultaneously opens a normally closed motor control switch 39, thereby breaking the power circuit to main motor 17. The raising of transparent front door 38 (FIG. 25) and the subsequent removal of the filled box return the actuated holding circuits and switches to their original states so that when the front door 38 is again closed, the control circuits and associated mechanical parts are ready for recycling.

Magazine 20

Referring in detail to FIGS. 1, 2, 4, 5 and 17, the box storing, feeding, erecting and delivery mechanism has chassis, denoted generally at 41, including a front plate 42 rigid with a pair of elongate horizontal rails 44 and 46 mounted across the interior of case 10 on supports not shown. Over the right hand portions of rails 44 and 46, as seen in FIG. 1, is disposed the magazine 20 in which flat collapsed boxes B are stored in a circular row. Magazine 20 has a central rotatable boss 50 flared outwardly as at 52 for engagement by the beveled corners 53 of the collapsed boxes, these being the means by which proper orientation of the boxes in the magazine are insured. An outwardly extending bottom flange 54 at the lower edge of the outward flare 52 supports the lower inner corners of boxes when groups of them are being placed in the magazine immediately before they are arranged in final position indicated in FIG. 2.

The outer side edges of the collapsed boxes B are supported within a basket-line frame denote generally at 55 in FIG. 5, the frame including lower radial spokes 56 whose outer ends support vertical posts 58 having upper portions connected by a fixed ring 60. Rollers 62 on the upper ends of post 58 support a rotatable ring 64 against which the upper outer corners of the stacked boxes B abut. A central post 66 rigid with and extending upwardly from boss 50 is biased by a strong spring (not shown) within boss 50 for counter-clockwise rotation as seen in FIG. 5. A radial arm 68 affixed on the upper end of post 66 supports a shove plate 70 which engages against the rear end of the stack in the magazine, and normally forces the stack around the magazine. A spring latch 72 on the free end of arm 68 releasably engages a vertical back-up post 74 so as to disable arm 68 while magazine 20 is being filled with collapsed boxes. A micro switch 76 (FIGS. 2, 4, 5 and 18) supported on chassis 41 has a switch arm 78 which normally rides against the edges of the collapsed boxes in magazine 20. When the supply in the magazine is nearly exhausted, micro switch 76 opens away from contact 80 (FIG. 18) and closes against contact 82, thereby closing the power circuit for a warning light 84 and simultaneously de-energizing a solenoid 86 in the coin handling mechanism. By well known coin-control apparatus (not shown) coins inserted through slot 14 are returned at opening 80 in the front of case 10.

The primary function of magazine 20 is to force the endmost collapsed box B against bade 18 in the position shown in FIGS. 2, 7 and 16. As considered with respect to the direction of feed of the collapsed boxes B from magazine 20 to erecting form 22, the boxes, then being flat, have leading and trailing edges 90 and 92 respectively constituted by one opposed pair of corner folds. In the collapsed condition of a box, the other opposed pair of corner folds 94 and 96 respectively are, as yet, unbent. It should be noted particularly that box panel P¹ has, adjacent the upper and lower edges of the box, a pair of tabs 98 and 100, respectively, which project beyond fold line 94 and freely overlap the adjacent panel P². Slits 102 through panel P² extend beneath and just beyond the free edges of tabs 98 and 100. Further details of the tabs and notches are disclosed and claimed in my copending application Serial No. 774,478 entitled, Tabs and Notches on Self-Erecting Box filed November 17, 1958, now U.S. Patent No. 2,963,212.

Blade 18

Blade 18 (FIG. 2) is secured, as at 104, to a lever arm 106a pivoted at 108 on chassis front plate 42. A brace 110 rigidly connected between lever 106a and the forward end of the blade prevents deflection of the blade. Prongs 112, 114 projecting from the rear face of the blade engage beneath tabs 98 and 100 respectively and project into slits 102 so that when the blade swings counter-clockwise, as seen in FIGS. 2 and 7, for example, the blade engages the endmost collapsed box and wipes it off the end of the magazine stack. Blade 18 has an elongate heel 116 so that the blade always overlies the end of the blank stack in the magazine and functions as a dam against which the endmost collapsed box is pushed. A roller 118 on backup post supports blade 18 against the forward thrust of the stack, and a spring biased stripper 120 on chassis arm 122 prevents blade 18 from wiping off more than one collapsed box from the stack end. The other end 106b of the lever beyond pivot 108 is curved and provided with a cam slot 124 in which engages a crank pin 126 on the end of a crank arm 128 affixed at 130 on the forward end of a drive shaft 132. Drive shaft 132 is rotatably supported by bearings in front chassis plate 42 and a rear chassis plate 133, and coupled as at 134 to main motor 17 (FIG. 5), the latter being supported on the rear side of rear chassis plate 133 by stand-off mountings 136. Drive shaft 132 undergoes one complete revolution during each complete operating cycle of the machine, and between operating cycles, crank arm 128 dwells slightly counter-clockwise from the position shown in FIGS. 2 and 7, and blade 18 dwells slightly below the FIGS. 2 and 7 position, i.e., with prongs 112, 114 just below tabs 98 and 100 respectively. When main motor 17 is energized, lever 106a, 106b rotates clockwise, as seen from the front of the machine, and the driving engagement of crank pin 126 in the inner portion of cam slot 124 oscillates blade 18 counter-clockwise on its feed stroke. Prongs 112, 114 slide beneath tabs 98 and 100 respectively, engage into slits 102 in the endmost collapsed box B and feed the wiped-off box along an arcuate feed path, as will be apparent by comparing the successive views FIGS. 7 and 8, until the leading edge 90 of the collapsed box is shoved into erecting form 22. The further rotation of crank arm 128 through the successive positions diagrammed in FIGS. 9, 10 and 11 drive blade 18 along its return stroke from form 22 back to its between-cycle dwell position after the blade has shoved the box into the erecting form. Blade 18 has a clearance slot 137, and a pair of openings 138, 140 through which a pair of springs 142 project for kicking the trailing edge 92 of the then-collapsed box B rearwardly while the leading edge 90 of the box is being shoved into the erecting form. Springs 142 also constitute means for pushing the lower portion of the endmost box in the magazine stack slightly away from feed blade 18 when the latter is in its dwell position of FIG. 2, thereby slightly flexing the collapsed box B and bending panel P² back so that the free ends of tabs 98 and 100 are slightly away or loose from panel P². Blade prongs 112, 114 can thus slide easily beneath the box tabs.

FIGS. 16A and 16B illustrate a modified form of prongs 112a and 114a on blade 18a wherein spring metal strips 115, 117 are spot welded to the forward face of the blade with their free ends projecting rearwardly through slots 119, 121. Strips 115, 117 are sufficiently resilient so that they flex back so that their pointed free ends lie nearly flush with the rear face of blade 18a when the endmost collapsed box in the magazine presses against the rear face of the feeder blade. However, if the endmost box is slightly spaced away from the blade, prongs 112a, 114a spring outwardly enough to engage into the notches on the box and thereby feed the box, even though the latter be slightly out of feeding position.

Erecting Form 22

Referring primarily to FIGS. 2, 12, 13 and 14 which show erecting form 22 in the position in which it receives a box B and holds it while the latter is erected and then filled with popcorn, form 22 is supported on a base plate 144 having a rectangular concavity 146 in one edge. Form 22 consists of a vertical sheet metal open shell secured in concavity 146, and having adjacent side walls 148 and 150 connected by a right angle bend 152, and another right angle bend 154 connecting adjacent side walls 150 and 156. Wings 158 and 160 flare outwardly from the forward edges of side walls 148 and 156. As detailed best in FIGS. 3, 4 and 6, base plate 144 is mounted by screws 161 on a collar 162 affixed on the upper end of the vertical shaft 164 rotatably mounted in vertically spaced chassis brackets 166 and 168. A collar 170 secured on vertical shaft 164 has an eccentric projection 172 with a vertical pin socket 174 for receiving the pin 176 which rotatably supports an enlarged head 178 having a cross slot 179 across its top. A lever 180 is swingably mounted on the chassis by means of a hollow stub shaft 182, with which the lever is rigid, the stub shaft rotatably fitting over a pintle 184 on the chassis. Projecting forwardly from the upper end of lever 180 is a crank pin 186 which engages in cross slot 179 so that as lever 180 oscillates about pintal 182, vertical shaft 164 and, in turn, form 22 are correspondingly oscillated.

Lever 180 is driven by a pair of cam follower pins 188 and 190, pin 188 being on the lower end of the lever and pin 190 being at the free end of an arm 192 whose inner end is rigidly affixed to stub shaft 182. A cam 194 on drive shaft 132 drives pin 188 and a second cam 196 also on drive shaft 132 drives pin 190, it being apparent from FIG. 6 that a rise on cam 194 engages the follower pin 188, lever 180 is oscillated counter-clockwise, as seen from the rear of the machine, and when a rise on cam 196 engages pin 190, lever 180 swings in reverse, clockwise direction. Cams 194 and 196 are profiled so that erecting form 22 is in the position diagrammed in FIG. 15 during the between-cycle dwell of the feed blade. However, when drive shaft 132 starts to rotate, the sharp rise in the profile of cam 196 drives the cam pin 190 upwardly, thereby oscillating lever 180 rapidly clockwise, as seen from the rear of the machine, and correspondingly swinging form 22 rapidly counter-clockwise, as seen from the top of the machine. Before blade 18 reaches its FIG. 8 position, erecting form 22 has reached its position of FIGS. 12, 13 and 14, and there it dwells until the feed blade has substantially completed its return stroke, the blade drive parts being then as illustrated in FIG. 11. During the final return stroke movements of blade 18, an abrupt rise on cam 194 engages pin 188 so as to swing lever 180 abruptly counter-clockwise, as seen from the rear of the machine, correspondingly to swing erection form 22 from the box erecting and filling position illustrated in FIGS. 12, 13 and 14 to the box delivery position shown in FIG. 15 and FIG. 1.

Pusher 24

Referring primarily to FIGS. 2, and 7 to 15 inclusive, pusher 24 is essentially a vertical post 198 having a V-shaped working edge 200 of which the rear wing 202 is substantially longer than the front wing 204. Post 198 is rigid with a carriage 206 having slots 208 and 210 in which rollers 212 and 214 engage. Rollers 212 and 214 are rotatably mounted on the front chassis frame plate 42. Also rigid with carriage 206 is a downwardly extending bracket 216 slotted at 218 and supported on a roller 220. Pusher 24 is thus mounted on the chassis for horizontal reciprocatory movement between a retracted position as in FIG. 2 and an advanced position as in FIG. 14. A return spring 222 anchored as at 224 on chassis plate 42 and, as at 226 on carriage 206 normally biases pusher 24 towards the retracted position of FIG. 2. The advancing drive of pusher 24 is as follows: Affixed on drive shaft 132 immediately behind crank arm 128 is a stub cam 228. Bracket 216 has a curved, receding cam surface 230 and an adjacent straight cam surface 232. When drive shaft 132 is rotated sufficiently to advance blade 18 to its extreme forward position (slightly beyond the FIG. 8 position) stub cam 228 engages cam surface 230 so as to advance pusher 24 slowly from its FIG. 2 position to its FIG. 13 position. Meanwhile, slightly before blade 18 reached the end of its feed stroke, and before pusher 24 starts to advance, springs 142 on the feeder blade kick the trailing edge 92 rearwardly into the V 200 on the front side of pusher post 198, as diagrammed in FIG. 12. A bent wire spring 205 mounted on the top of pusher post 198 also urges the trailing edge 92 of the box into V surface 200 of the pusher post. The forward termination of the feed stroke of feeder blade 18 and the motion of stub cam 228 along cam surface 230 coincide; the slight initial advance of pusher 24 forces the leading edge 90 of the hitherto collapsed box blank B into corner 152 of erected form 22 so that the side panels of the box blank spread apart sufficiently to swing tabs 98 away from box panel P², thereby freeing blade prongs 112, 114 from beneath the box tabs so that, as the feeder blade retracts, it will not drag the fed box blank back with it. As feeder blade 18 moves on its return stroke, stub cam 228 moves along straight cam surface 232 so that pusher 24 momentarily dwells. However, when feeder blade 18 continues its return stroke to the position diagrammed in FIG. 10, a rearward projection 127 (FIG. 3) of crank pin 126 on the free end of crank arm 128 engages the curved cam surface 234 on bracket 216 so as to advance pusher 24 rapidly from its FIG. 13 position to that of FIG. 14, wherein it dwells as the rearward projection of cam pin 126 moves along straight cam surface 232 of bracket 216. There is, at this point in the operating cycle, a momentary dwell in the operation of the box feeding and erecting mechanism while the popcorn dispenser motor 26 operates the charge measuring device 28 so as to fill the erected box, then clamped in form 22 as diagrammed in FIG. 14, with popcorn. When the box has been filled with popcorn, the main motor 17 resumes its operation and the rearward projection 127 of crank pin 126 enters the curved, concave cutout cam surface 236 and, as the crank pin moves further around surface 236, return spring 226 slowly returns pusher 24 to its initial FIG. 2 position while erecting form 22 swings to its delivery position of FIG. 15.

*Stripper s*

Two of the major problems in feeding, or wiping off a collapsed box from the end of a stack are, first, positioning the endmost collapsed box at an exact point of pickup and, second, preventing the next-to-endmost collapsed box from being swept along when the endmost one is wiped off, or, at least, from being dragged out of position. While a fixed stripper *s*, disposed over the stack end is of some value in preventing the next-to-endmost box from being fed, it may permit slight misposition at the stack and, sufficiently to cause the feeder blade to miss, because stripper *s*, being fixed, cannot be disposed against the tops of the collapsed boxes in magazine 20 lest it block the advance of the stack towards the feed position. In order to position and hold the last few collapsed boxes, and the next to endmost one, in the magazine stack immediately prior to the advance of the next-to-last one into feeding position, a stripper *s*, consisting of an L-shaped plate is mounted on the end of pusher carriage 206, in position to engage over the upper left-hand corners, as seen in FIG. 2, of the last few boxes approaching feed position, save the endmost one, in the magazine stack. After the endmost collapsed box has been fed to erecting form 22, stripper *s* moves away from the collapsed boxes stacked in magazine 20 and permits the stack to advance so that the former next-to-last collapsed box B moves into feeding position. When pusher carriage 206 returns to its dwell position of FIG. 2, stripper *s* engages over the upper left-hand corners of the collapsed boxes and forces their opposite beveled corners 53 against the inclined surface 52 of magazine box 50, thereby precisely positioning them.

*Electrical Circuits*

Referring next to FIG. 18, the electrical circuits for machine, except for those which energize a popcorn heater and advertising signs, are shown in their between-cycle state. A manual cycle starting switch 242 is provided for test operation, but, ordinarily, the only between-cycle circuit between input terminals 238 and 240 is established through coin controlled switch 16 which normally engages contact 244 and through contactor 246 of a holding relay whose winding 248 is then de-energized, to contact 250 and thence through box magazine switch 76. Assuming that there is a supply of collapsed boxes in the magazine, the circuit continues from contact 80 through the coin control winding 86, door latch switch 39 and door switch 40, assuming door 38 to be closed, to the other power input terminal 240. If door 38 is open, door switch 40 is correspondingly open to break the supply circuit for coin control winding 86. The circuit for winding 86 will likewise be opened if there are insufficient collapsed boxes in magazine 20 to hold switch 76 closed against contact 80.

FIG. 19 diagrammatically illustrates the holding circuit first activated by inserting the coin through slot 14. As the coin trips switch 16, contact 252 is momentarily contacted, thereby sending a pulse through a counter *c* whose circuit to power input terminal 240 is completed through conductor 254. An energizing pulse through holding relay winding 248 is similarly transmitted through conductors 256 and 258 and through normally closed door switch 40 to power input terminal 240, whereupon holding relay contactor 246 swings from contact 250 to 260. Simultaneously, a second contactor 262 of the holding relay is closed against contact 264 and thus a holding circuit is established from input terminal 238 through conductor 266, holding relay contact 264, contactor 262 and thence through holding relay winding 248, conductor 258 and door switch 40 to power input terminal 240. As will subsequently be observed, the holding circuit for winding 248 remains closed until door switch 40 is opened.

The closure of holding relay contactor 246 against contact 260 energizes the circuit of main motor 17 as diagrammed in FIG. 20. It will be observed that the coin has passed coin switch 16 and the latter has returned to its normal position, closed against contact 244. The circuit from input terminal 238 thence runs through holding relay contactor 246, contact 260 and through one armature 268 of box switch 25 (on erecting form 22), motor contact 270, main motor 17, and through conductors 272, 274 and normally closed door latch switch 39, and normally closed door switch 40 to power input terminal 240. Whereas, at the start of the operating cycle, a switch cam 276 on the main motor shaft 132 held cycle end switch 33 closed, the initial rotation of main motor shaft 132 immediately opens cycle end switch 33. Dash line 278 denotes that a collapsed box is being fed towards box switch 25 on erecting form 22. Unless a box is erected in form 22, armature 268 remain closed against motor contact 270, main motor 17 will continue to operate, and the mechanism will embark and continue on a succeeding box feeding and erecting cycle. This constitutes a fail-safe feature to guard against the following contingencies: If the blade prongs fail to engage beneath the tabs on the collapsed box at the end of the magazine stack, the blade will continue through its feed and return strokes and take another pass at the missed box; if the box falls off the feed blade during the feed stroke, it will drop downwardly in front of the mechanism into the bottom of casing 10; if, when pusher post 198 moves from its initial full line position diagrammed in FIG. 12 to its FIG. 13 position, the box fails to start opening as illustrated in 15, the comparatively stiff unopened box blank has sufficient spring so that, when flexed between form 22 and post 188, it will merely snap forwardly and fall harmlessly downward past the front of the mechanism into the bottom of casing 10.

FIG. 21 illustrates the active circuits which come into play as soon as the box has been erected in form 22 so that its side panel P1 engages plunger 25a and box switch 25. One armature 268 of box switch 25 swings from main motor contact 270 and is held closed by the erected box in the form against contact 280, thereby energizing popcorn dispenser motor through conductors 282, 284, 286, normally closed relay contactor 288, relay contact 290 and conductor 202 and thence through door latch switch 39 and door switch 40 through power input terminal 240. The main motor is temporarily de-energized while popcorn dispenser motor 26 operates sufficiently to cause the popcorn measuring device 28 to discharge a box load of popcorn into the awaiting erected box.

A switch cam on the shaft of popcorn dispenser motor 26 (diagrammatically indicated in FIG. 1 but not detailed) controls the contactors 294 and 296 of a double-pole single-throw switch 31. As is apparent in FIGS. 18 and 21, contactors 294 and 296 are away from their respective contacts 298, 300 at the start of the operation of popcorn dispenser motor 26. However, after popcorn motor 26 has nearly completed sufficient rotation to cause charge measuring device 28 to dispense enough popcorn to fill the waiting erected box, switch contactors 294 and 296 are closed against contacts 298 and 300, as indicated in FIG. 22, and the following sequence of events occurs: A circuit through winding 302 of a triple-pole single-throw relay is completed from conductor 282 through contactor 294, contact 298, winding 308 and conductor 292. A stick circuit contactor 304 is pulled closed by winding 302 against contact 306 so that the winding 302 will remain energized after contactor 294 of popcorn dispenser motor switch 31 reopens away from contact 298; winding 302 pulls closed a second contactor 308 against contact 310, thereby establishing a jump circuit around box switch 25 with the resultant re-energization of main motor 17; thirdly, the energization of winding 302 opens contactor 288 away from contact 290. The closing of the contacts of switch 31 by dispenser motor 26, as indicated in FIG. 22, is of short duration. Briefly after contactor 288 has been opened by relay winding 302, the energizing circuit for popcorn dispenser motor 26 is completed through contactor 296 and contact 300 in a jump circuit 314 around contactor 288. However, after slight further rotation of popcorn dispenser motor 26, contactors 294 and 296 of switch 31 re-open and the condition diagrammed in FIG. 23 prevails, wherein main motor 17 restarts, erecting form 22 is rotated to swing the filled box to the delivery station at the front of the machine, feeder blade 18 nears the end of its return stroke, and switch cam 276 on main motor shaft 132 is about to close cycle end switch 33.

Up until the condition diagrammed in FIG. 24, door-latch solenoid 34 has been de-energized. Whereas, at the start, cycle end switch 33 was closed (FIGS. 18 and 19) thereby connecting solenoid 34 to power input terminal 240 through conductor 316 and cycle end switch 33, the connection of solenoid 34 to the other power input terminal 238 was broken by the open contact door 318, which is part of box switch 25, a double pole switch. During the conditions diagrammed in FIGS. 21, 22 and 23 when the erected box in form 22 holds contactor 318 closed against contact 320 (thereby connecting one side of solenoid 34 to power input terminal 238 via conductor 266, contactor 318, contact 320 and conductor 322) cycle end switch 33 was opened by the rotation away from it of switch cam 276 on main motor shaft 132 so that solenoid 34 was disconnected from power input terminal 240. However, in the FIG. 24 condition, form 22 has been rotated to the FIG. 15 position wherein it presents the filled box at the delivery station, as illustrated in FIG. 1, at the front of the machine and, the filled box still being in form 22, the box switch contactor 318 disposed against contact 320 and cycle end switch 23 is closed. Door latch solenoid 34, being energized, opens the door latch 36 and simultaneously opens a motor control switch 39, thereby killing all potential circuits to both main motor 17 and popcorn dispensing motor 26.

FIG. 25 illustrates the final phases of the circuit operations. In order to remove the filled box of popcorn from form 22 at the delivery station, the customer raises front door 38, thereby opening door switch 40 and thus breaking the circuit through winding 248 of the holding relay and permitting its contacts to reset to their FIG. 18 positions. Then when the customer removes the filled box from form 22, plunger 25a moves back into the form and contactors 268 and 318 of box switch 25 revert to their FIG. 1 positions. When the customer releases door 28, it slides close by gravity, thereby permitting door switch 40 to reclose. It is noteworthy that until the customer removes the filled box from the delivery station, the machine cannot be recycled and, so long as door 38 is open, door switch 40 remains open so that the power circuits to the motors are killed and also dead is the circuit for holding relay winding 248. This makes it impossible for a customer to get his hand caught in form 13 because the form cannot move at any time when the door is open. Should door 38 at any time be forced open, or should the latch fail to seat properly, door switch 40 opens, thereby immediately breaking the power circuit from power input terminal 240 and consequently shutting off the power supply to main motor 17 and popcorn dispenser motor 26.

The invention is not limited to the details disclosed and described herein, but is intended to cover all substitutions, modifications and equivalents within the scope of the following claims:

I claim:

1. In a vending machine for merchandise, including a cabinet having a delivery opening in a front wall thereof, a door for closing said opening, a box form, a normally engaged latch for said door, means mounting said form in said cabinet behind said door for rotation about a vertical axis, said form having vertical wall means defining a concavity facing radially with respect to the axis of rotation thereof, means for rotating said form about said vertical axis between a first angular position in which the concavity of said form faces substantially forwardly towards said door and a second position angularly spaced from the first position, drive means for moving said form between said positions, means coordinated with the drive means for feeding a box into said form in the second position thereof and dispensing means for filling said box with merchandise, means coordinated with said dispensing means for causing said drive means to move said form from the second position to the first position, means coordinated with movement of said form from the second position to the first position for disengaging said latch, and means responsive to opening of said door for disabling said drive and dispensing means.

2. In a vending machine for merchandise including a cabinet having a delivery opening in a vertical exterior wall thereof, a door for closing said opening, a normally engaged latch for said door, a box form, means mounting said form in said cabinet, for movement between a first station in which the concavity of the form faces towards said delivery opening and a second station remote from the first station, drive means for moving said form from one station to the other and vice versa, box feeding and erecting means coordinated with the drive means for feeding a box into said form when the latter is at said second station, dispensing means including a discharge outlet adjacent said second station for charging said box with merchandise, means coordinated with said dispensing means for operating said drive means to move said form from the second station to the first after predetermined operation of said dispensing means, means coordinated with the movement of said form from the second position to the first for releasing said latch, and means responsive to the opening of said door for disabling said drive and dispensing means.

3. In a vending machine for merchandise including a cabinet having a delivery opening in a vertical exterior wall thereof, a door for closing said opening, a normally engaged latch for the door, a box form, means mounting said form in said cabinet behind the delivery opening for rotation about a vertical axis, said form having vertical wall means defining a concavity facing radially with respect to the axis of rotation thereof, drive means operable to rotate said form about said vertical axis between a first station in which the concavity of the form faces towards said delivery opening and a second station angularly spaced from the first station, means coordinated with the drive means for feeding a box into said form when the latter is at said second station, dispensing means including a gravity discharge outlet above said second station for charging said box with merchandise, means in said form responsive to the feeding of a box thereto for operating said dispensing means, means coordinated with said dispensing means for operating said drive means to rotate said form from the second station to the first after predetermined operation of said dispensing means, means coordinated with the movement of said form from the second station to the first for disengaging said latch, and means responsive to the opening of said door for disabling said drive means.

4. In a vending machine for merchandise, a cabinet having a delivery opening in a front wall thereof, a door for closing said opening, a normally engaged latch for the door, a box magazine in said cabinet, said magazine being disposed below and to one side of the delivery opening, a box form, means mounting said form in said cabinet behind said opening for oscillation about a vertical axis, said form having vertical wall means defining a concavity facing radially with respect to the axis of rotation thereof, form drive means operable to oscillate said form about said vertical axis between a first dwell position in which the concavity of the form faces forwardly towards said delivery opening and a second dwell position angularly displaced from the first position, in which the concavity faces in the lateral direction of the magazine, and thence reversely from the second position back to the first, a box feed blade, means mounting said feed blade for oscillation about horizontal axis along an arcuate feed stroke between the magazine and the second position of the form, blade drive means coordinated with the form drive means for oscillating said feed blade along said arcuate feed stroke from the magazine to the form whereby the feed blade feeds a box into the form when the form is at said second dwell position, merchandise dispensing means having an outlet above the second station of the form, means coordinated with the form and blade drive means for operating said dispensing means subsequent to the feed stroke of the blade and prior to return to the form from the second dwell position to the first, and means coordinated with the form drive means for releasing said door latch upon return of the form from the second dwell position to the first.

5. The combination claimed in claim 4, and means responsive to the opening of said door for disabling said form and blade drive means and said dispensing means so long as the door remains open.

References Cited in the file of this patent

UNITED STATES PATENTS

| | | |
|---|---|---|
| 1,885,368 | McLellan | Nov. 1, 1932 |
| 1,991,223 | Ledig et al. | Feb. 12, 1935 |
| 2,051,344 | Parks et al. | Aug. 18, 1936 |
| 2,249,201 | Ferguson | July 15, 1941 |
| 2,687,070 | Gastright | Aug. 24, 1954 |
| 2,694,350 | Malhiot | Nov. 16, 1954 |
| 2,757,498 | Meyer-Jagenberg et al. | Aug. 7, 1956 |
| 2,815,774 | Carew | Dec. 10, 1957 |
| 2,827,927 | Findlay | Mar. 25, 1958 |
| 2,844,927 | Warner | July 29, 1958 |
| 2,972,842 | Hitchcock | Feb. 28, 1961 |